Sept. 3, 1935.  J. D. TYGART  2,013,370

SPRAYING APPARATUS

Filed Jan. 24, 1935

Inventor

J. D. TYGART,

By Shepherd Campbell
Attorneys

Patented Sept. 3, 1935

2,013,370

UNITED STATES PATENT OFFICE 2,013,370

SPRAYING APPARATUS

Jeff D. Tygart, Miami, Fla.

Application January 24, 1935, Serial No. 3,343

6 Claims. (Cl. 299—46)

This invention relates to spraying apparatus particularly adapted for use in spraying cotton, tobacco, vegetables, and various other growing plants, planted in rows.

The object of the invention is to provide a structure of the character indicated in which very effective means are provided for maintaining agitation and a thorough mixing of the contents of the spray tank. A further object of the invention is to provide such a correlation and assemblage of the necessary elements of the machine as to maintain a low center of gravity, with consequent freedom from undesirable tipping of the structure. It is a further object of the invention to provide a structure adapted to be drawn by a horse or other draft animal, to be manually guided after the manner of a cultivator or plow, and to have its pumps actuated from the ground wheels, under the influence of the movement imparted to the structure by the draft animal, and to so arrange these ground wheels that they may be laterally adjusted upon the main shaft or axle to accommodate rows of varying widths. Further objects and advantages of the invention will be set forth in the detailed description which follows.

Figure 1:
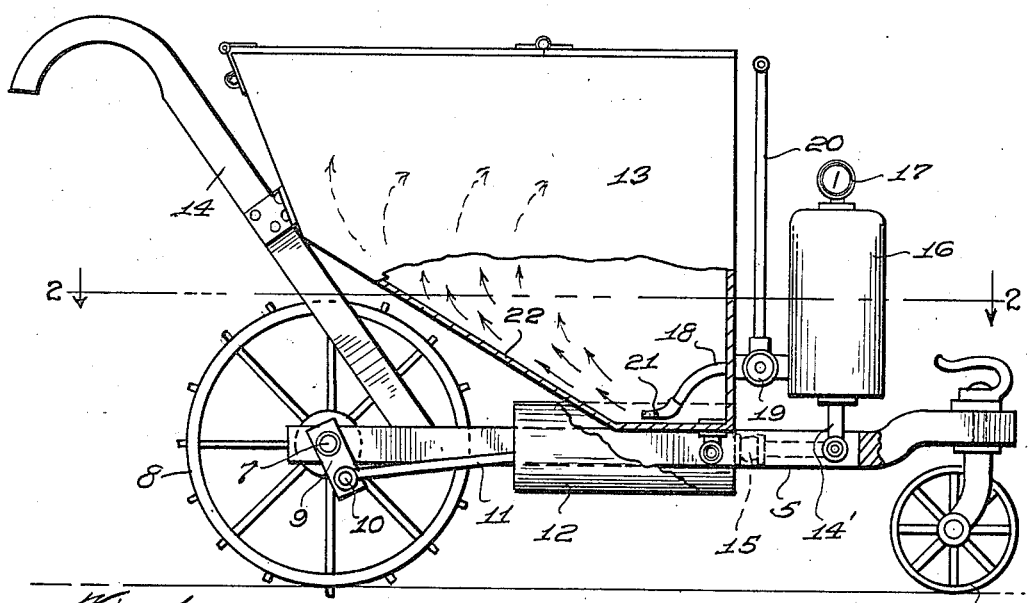
Figure 2:
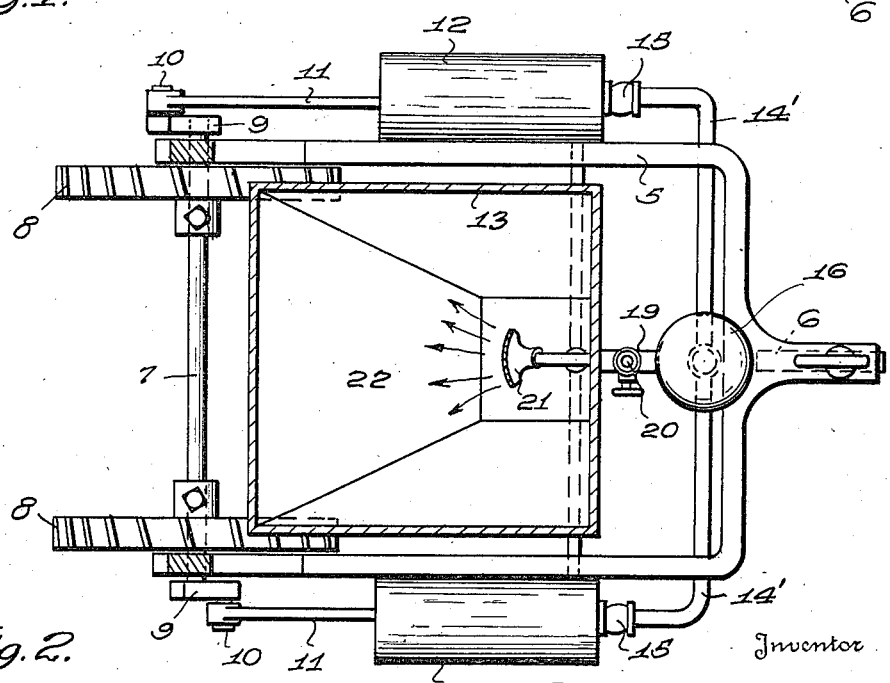

In the accompanying drawing:

Fig. 1 is a view partly in side elevation and partly in section of a device constructed in accordance with the invention, and Fig. 2 is a horizontal sectional view upon line 2—2 of Fig. 1.

Like numerals designate corresponding parts in both of the figures of the drawing.

The device of the present invention comprises a horizontal frame 5, the forward end of which is mounted upon a caster wheel 6 and the rear end of which is supported upon a transverse shaft or axle 7, carrying the ribbed traction wheels 8. The wheels 8 are secured by set screws to the shaft 7 so that they may be adjusted along said shaft to bring them closer together or farther apart to accommodate rows of varying widths.

The shaft 7 carries cranks 9 upon its outer end and these cranks in turn carry wrist pins 10 for the actuation of the connecting rods 11 of pumps 12. A tank 13 is supported upon the frame 5 and from the guide handles 14 by which the structure is guided after the manner of a cultivator or plow. The pump cylinders 12 receive the supply of spray fluid from the tank 13 and discharge the same through pipe 14' past check valve 15 into a pressure tank or dome, 16. A pressure gauge 17 may be mounted upon this dome.

The discharge pipe 18 from the pressure dome carries a regulating two-way valve 19 of a conventional and well known type, which is adapted to permit any desired proportions of the discharged liquid to pass to the nozzle pipe line 20 and any desired portion to pass to the agitating nozzle 21 which extends into the tank 13 and is horizontally widened or flared and flattened to set up an agitating current from the lowest point of the tank upwardly along an inclined rear wall 22 of the tank, in such manner as to set up an effective circulation in the manner indicated by the arrows, whereby thorough agitation of the contents of the tank 13 is effected and the keeping in suspension of the solids of the spray material is assured.

The spray pipe 20 may carry transverse nozzle supply pipes at its upper end (only one of which is indicated) so that the machine may be caused to spray in opposite directions, or the nozzle pipe 20 may have a hose attached thereto by which the spray may be hand-directed.

It will be observed that the pumps are disposed horizontally and at a very low point upon the machine, and since these pumps are among the most weighty portions of the structure, it follows that this arrangement tends to provide a low center of gravity by virtue of which undesirable tipping over of the spray machine is prevented.

It is to be understood that the invention is not limited to the precise arrangement shown and described, but that it includes within its purview whatever changes fairly come within either the terms or spirit of the appended claims.

Having described my invention, what I claim is:

1. A traveling wheeled plant spraying machine of the character described comprising a substantially horizontally disposed frame mounted upon ground wheels and lying substantially in the horizontal plane of the axis of the rearmost ground wheels and provided with means through which it may be drawn, guiding handles for the manual guiding of the frame, a tank for spray material supported upon the frame and having a rearwardly and upwardly inclined bottom wall, the forward end of which terminates at the lowest portion of the tank, pumps actuated from the ground wheels, an agitating nozzle and means for supplying a part of the fluid discharged from said pumps to the agitating nozzle, said agitating nozzle terminating at the lowest point of the tank and directed to discharged upwardly along the rear and bottom wall of the tank.

2. A structure as recited in claim 1 wherein the agitating nozzle is flattened and laterally extended at its terminal end for the purposes stated.

3. A structure as recited in claim 1, in combination with a nozzle supply line and a regulating valve, said regulating valve being disposed to discharge desired proportions of the material discharged from the pumps into the nozzle supply line and to the agitating nozzle, respectively.

4. A travelling wheel plant spraying machine of the character described comprising a substantially horizontally disposed frame, ground wheels upon which said frame is supported, said frame lying substantially in the horizontal plane of the axis of said ground wheels, pumps disposed substantially horizontally along said frame and substantially in the horizontal plane thereof, a shaft upon which the ground wheels are mounted, means for actuating said pumps from said shaft, a pressure dome lying above the frame, a connection between the pressure dome and the pumps, a discharge line leading from the pressure dome, a control valve for said discharge line, a nozzle supply pipe leading from the casing of the control valve, an agitating nozzle leading from the casing of the supply valve, said supply valve serving to direct desired proportions of spray material to the nozzle supply pipe and to the agitating nozzle respectively, guiding handles of the plow handle type extending rearwardly and upwardly from the frame, and a supply tank for spray material supported from the frame and from said handles, having a rearwardly and upwardly inclined rear wall, said agitating nozzle terminating at the lowest portion of the tank and being directed to discharge upwardly along the said rearwardly and upwardly inclined wall of the tank, as described.

5. A travelling wheeled plant spraying machine comprising a pair of supporting and driving wheels, a substantially horizontal frame projecting forwardly from the driving wheels, a guide wheel at the forward end of said frame, guiding handles projecting upwardly and rearwardly from said frame, a tank upon the frame in advance of the driving wheels, to which said handles are connected, the bottom of which tank lies substantially in the plane of the said frame, a pair of pump cylinders outside of said frame and one upon each side thereof, said cylinders lying substantially in the plane of said frame, a transverse shaft upon which the driving wheels are mounted, connecting rods for the pump cylinders, cranks upon the outer ends of said shaft for actuating said connecting rods, a pressure dome located immediately in advance of the tank and into which said pumps discharge, a pipe leading from the lower portion of the pressure dome into said tank and terminating in a nozzle directed rearwardly along the bottom of said tank, said tank having a combined bottom and rear wall which is inclined sharply upward from a point adjacent said nozzle, a two-way valve in the pipe which leads from the dome to the tank, and a spray nozzle pipe leading from said valve.

6. In a plant spraying machine, a tank having the lower portion of its bottom wall disposed adjacent the front wall of said tank, the remainder of the bottom of the tank being inclined upwardly at an obtuse angle, a supply line for spray material, a pressure dome into which said line discharges, a nozzle disposed within the tank and directed rearwardly along the lowest portion of the bottom of said tank and toward the rearwardly inclined wall of said tank, a connection between the nozzle and the dome, a two-way valve in said connection, and a spray nozzle supply pipe leading from said valve.

JEFF D. TYGART.